Patented Sept. 2, 1924.

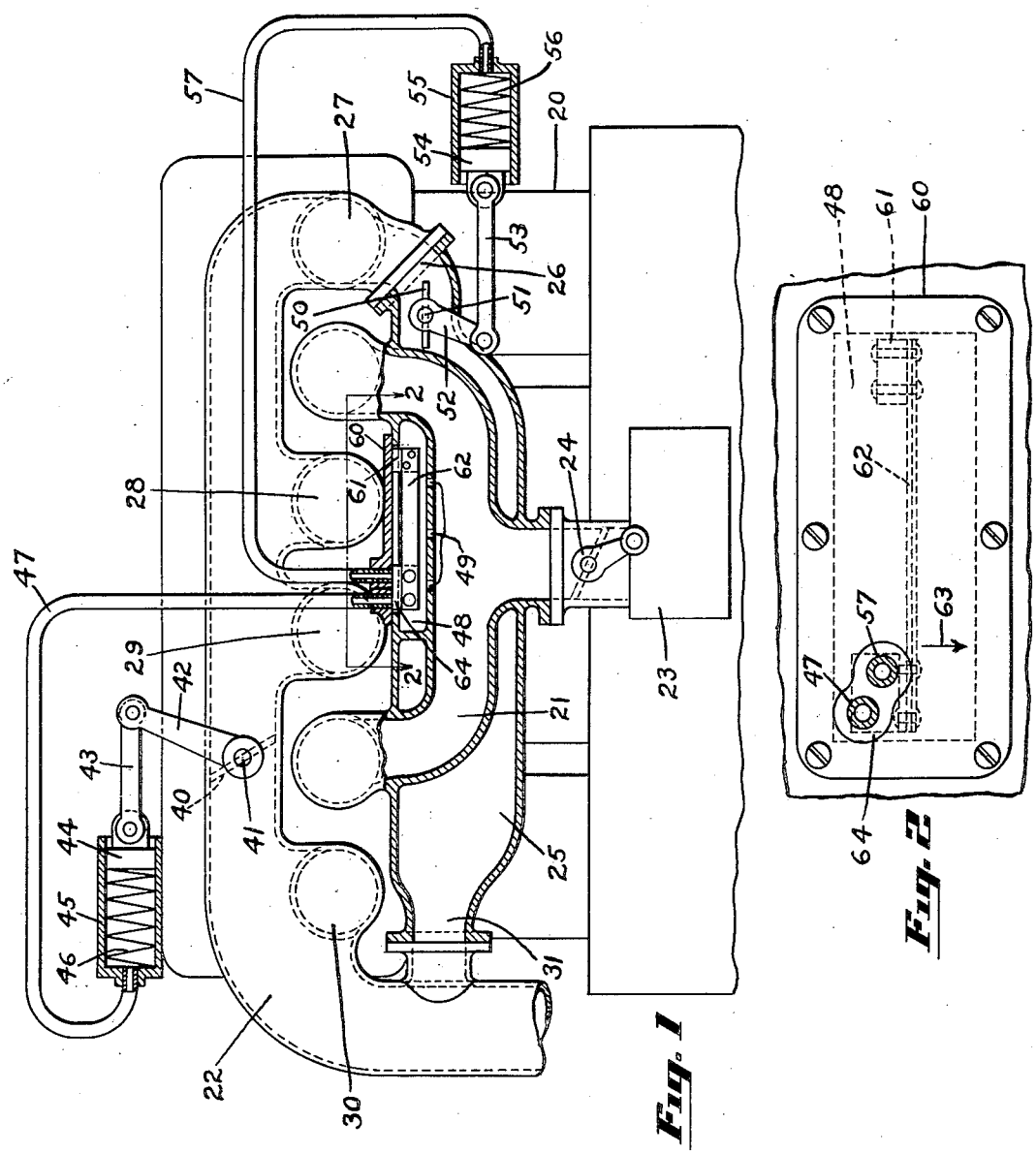

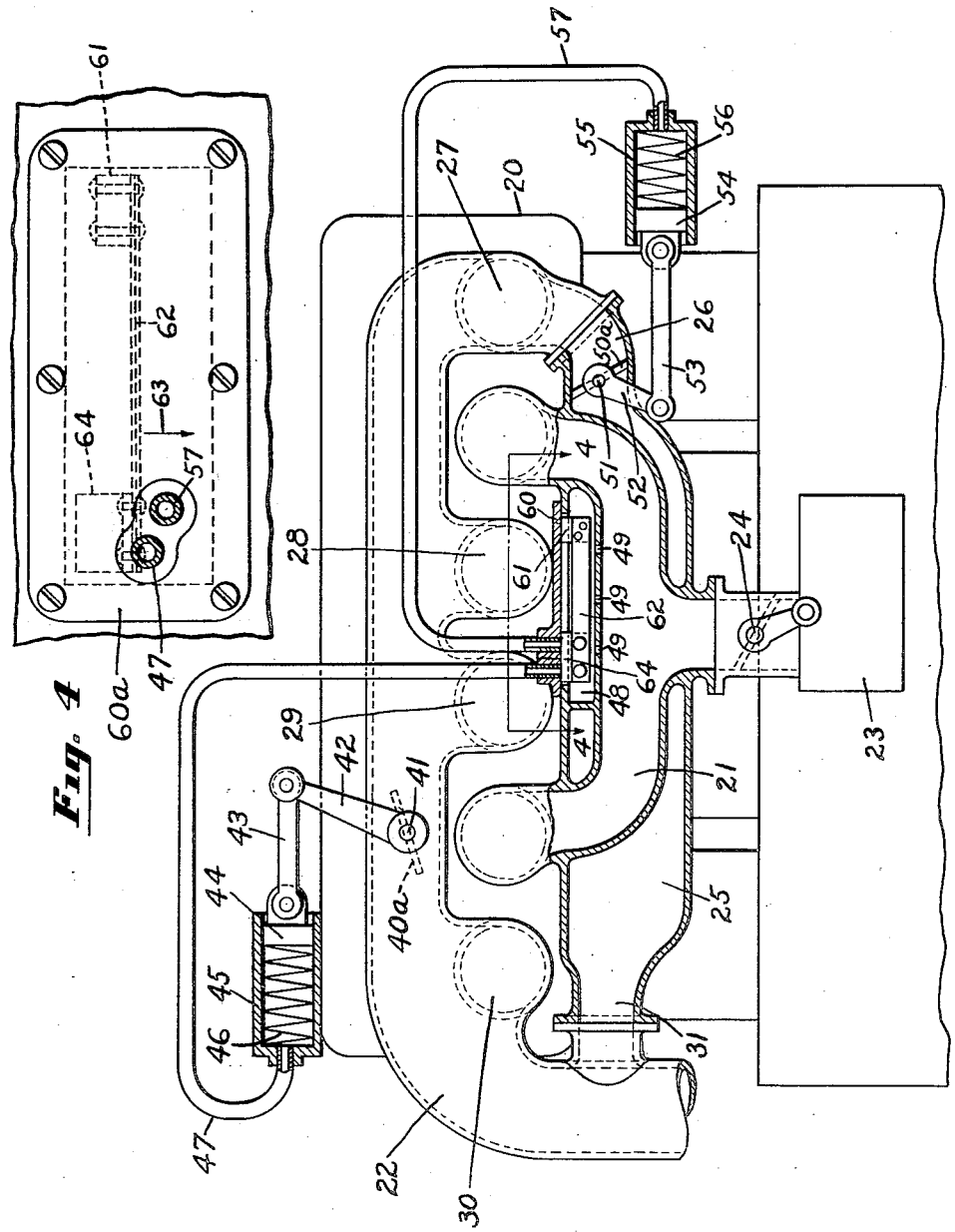

1,507,315

UNITED STATES PATENT OFFICE.

JOHN H. HUNT, OF DAYTON, OHIO, ASSIGNOR TO THE DAYTON ENGINEERING LABORATORIES COMPANY, OF DAYTON, OHIO, A CORPORATION OF OHIO.

MANIFOLD HEATING SYSTEM.

Application filed September 16, 1920. Serial No. 410,802.

*To all whom it may concern:*

Be it known that I, JOHN H. HUNT, a citizen of the United States of America, residing at Dayton, county of Montgomery, and State of Ohio, have invented certain new and useful Improvements in Manifold Heating Systems, of which the following is a full, clear, and exact description.

This invention relates to the preheating of the fuel mixture for internal-combustion engines, and particularly to that type of heating system in which the exhaust gases from the engine are caused to pass around the intake conduit.

One object of the invention is to control the temperature of the intake conduit in order that the heating of the fuel mixture may be carried on to a degree consistent with the efficient operation of the engine.

One method of carrying out the foregoing object is to provide a by-pass around a portion of the exhaust conduit which surrounds, like a jacket, a portion of the intake conduit. To control the passage of exhaust through this by-pass or jacket, one or more valves are provided. These valves are controlled by devices operated by the suction of the engine, and these suction devices are in turn controlled by a temperature responsive device.

Other and further objects and advantages of the present invention will be apparent from the following description, reference being had to the accompanying drawings, wherein preferred embodiments of the present invention are clearly shown.

In the drawings:

Fig. 1 is a side elevation of an internal-combustion engine, partly in section, showing an embodiment of the present invention;

Fig. 2 is a fragmentary sectional view taken approximately on the line 2—2 of Fig. 1;

Fig. 3 is a view similar to Fig. 1 but showing a modified form of the invention; and Fig. 4 is a fragmentary view taken substantially on the line 4—4 of Fig. 3.

In the drawings, an internal-combustion engine 20 is provided with an intake conduit 21 and an exhaust conduit 22. A carburetor 23 having a throttle 24 is in communication with the intake conduit 21. The jacket or by-pass conduit 25 is provided with an entrance 26 in communication with a portion of the exhaust manifold 22 adjacent one of the exhaust outlets 27 from the engine. The other exhaust outlets are designated by numerals 28, 29 and 30. This jacket or by-pass 25 surrounds a portion of the intake conduit 21 and is provided with an exit 31 leading into the exhaust conduit 22 outside of the exhaust outlet 30.

A valve 40 is located in the exhaust conduit 22 between the entrance and exit passages 26 and 31 of the jacket 25. Preferably this valve 40 is located between the exhaust outlets 29 and 30. The valve 40 is mounted on a shaft 41 which may be turned by a lever 42 connected by link 43 with a piston 44 operating in a cylinder 45. A spring 46 normally maintains the valve in closed position. The cylinder 45 is connected by a tube 47 with a thermostat chamber 48 in communication with intake conduit 21 by means of passages 49. This chamber 48 is not in communication with the jacket 25. A valve 50 is located adjacent the entrance 26 of jacket 25 and is mounted upon a shaft 51 capable of being turned by lever 52 which is connected by means of link 53 to a piston 54 operating in a cylinder 55. A spring 56 normally holds the valve 50 in open position. The cylinder 55 is connected by a tube 57 with the thermostat chamber 48.

Chamber 48 is provided with a cover plate 60 to which the tubes 47 and 57 are attached. A lug 61 depends from the plate 60 and carries a blade of thermostatic metal 62 adapted when heated to bend in the direction of the arrow 63. Blade 62 carries a flat valve 64 normally closing the ends of tubes 47 and 57.

The operation of the device is as follows:

When the engine starts up from a cold state, the exhaust gases from the exhaust outlet 30 may pass directly out through the conduit 22, but the exhaust from the outlets 27, 28 and 29 cannot pass except through the by-pass or jacket 25 thereby heating the intake conduit 21. As the blade 62 becomes heated it will bend in the direction of the arrow 63 in Fig. 2 and uncover the end of the tube 47. When this occurs the cylinder 45 will be placed in communication with the suction chamber 48. The suction of the engine will cause the piston 44 to move to the left as viewed in Fig. 1, thereby opening the valve 40, the degree of opening depending upon the amount of suction. When this occurs the jacket 25 will act merely as a by-pass and will conduct only a part of the exhaust gases away from the engine. As the temperature of the blade 62 increases, this thermostatic blade will bend still further in the direction of the arrow 63 and will open up the end of tube 57 as well as the tube 47. When this occurs the piston 54 will move to the right as viewed in Fig. 1, causing the valve 50 to close and completely shut off the supply of exhaust gas from the jacket 25. Then the temperature responsive blade 62 will tend to return to its original position to lessen the effect of the suction device whereupon more exhaust will be caused to pass through the jacket 25. In this manner the temperature of the intake conduit 21 is regulated.

In the modified form of the invention shown in Figs. 3 and 4, the normal arrangement and operation of the valves 40ª and 50ª is the reverse of that described and shown in Fig. 1. Valve 40ª is normally open instead of being normally closed as valve 40 shown in Fig. 1. Valve 50ª is normally closed instead of being normally open as valve 50 shown in Fig. 1. The tubes 47 and 57 are normally open instead of being normally closed as shown in Fig. 1. This arrangement is accomplished by changing the location of these tubes 47 and 57 with respect to the plate 60ª. The thermostatic element 62 bends in the direction of the arrow 63 on being heated, whereupon the valve 64 closes first the end of tube 47 and then the end of tube 57.

The operation of this form of the invention is as follows:

As soon as the engine starts, the suction produced thereby in the chamber 48 causes piston 44 to move to the left as viewed in Fig. 3 and the piston 54 to move to the right as viewed in Fig. 3, whereupon the valve 40ª will tend to close and the valve 50ª will tend to open. The degree of closing and opening, respectively, of these valves will depend upon the degree of suction of the engine. At light loads when the suction is greater these valves will be shifted to a greater degree. In some types of engines it may be desirable to have less heating of the intake when operating at a heavy load than when operating at a light load. As the temperature increases, the temperature responsive element 62 will bend in the direction of the arrow 63, whereupon the ends of the tubes 47 and 57 will be successively closed. When this occurs the springs 46 and 56 will cause the pistons 44 and 54 and valves 40ª and 50ª, respectively, to return to their normal positions as shown in Fig. 3, thereby tending to reduce the flow of exhaust through the by-pass or jacket 25.

While the forms of mechanisms herein shown and described constitute preferred forms of embodiments of the invention, it is to be understood that other forms might be adopted, all coming within the scope of the claims which follow.

What I claim is as follows:

1. In a system of control for intake heaters, the combination with an internal-combustion engine having an intake conduit and an exhaust conduit; of a jacket about said intake conduit; a valve controlling the passage of exhaust gases from said exhaust conduit into said jacket; a suction device in communication with the engine for operating said valve; and temperature responsive means for controlling said suction device.

2. In a system of control for intake heaters, the combination with an internal-combustion engine having an intake conduit and an exhaust conduit; of a jacket about said intake conduit and forming a by-pass about a portion of said exhaust conduit; a valve in said exhaust conduit located between the entrance into and the exit from said jacket; a valve controlling the entrance to said jacket, one valve being normally open and the other normally closed; suction devices in communication with the engine each for operating one of said valves; and a temperature responsive device for controlling said suction devices.

3. In a system of control for intake heaters, the combination with an internal-combustion engine having an intake conduit and an exhaust conduit; of a jacket about said intake conduit and forming a by-pass about a portion of said exhaust conduit; a normally closed valve in said exhaust conduit and located between the entrance into and the exit from said jacket; a normally open valve controlling the entrance into said jacket; a suction device in communication with the engine intake for opening the first named valve; a second suction device in communication with the engine intake for closing the second valve; and temperature responsive means for rendering said suction devices operative.

4. In a system of control for intake heaters, the combination with an internal-combustion engine having an intake conduit and an exhaust conduit; of a jacket about said intake conduit and forming a by-pass about a portion of said exhaust conduit; a normally closed valve in said exhaust conduit and located between the entrance into and the exit from said jacket; a normally open valve controlling the entrance into said jacket; a suction device in communication with the engine intake for opening the first named valve; a second suction device in communication with the engine intake for closing the second valve; and temperature responsive means for rendering the first suction device operative and then the second suction device operative with increase in temperature.

5. In a system of control for intake heaters, the combination with an internal-combustion engine having an intake conduit and an exhaust conduit; of a jacket about said intake conduit and forming a by-pass about a portion of said exhaust conduit; a normally closed valve in said exhaust conduit and located between the entrance into and the exit from said jacket; a normally open valve controlling the entrance into said jacket; a suction device in communication with the engine intake for opening the first named valve; a second suction device in communication with the engine intake for closing the second valve; and temperature responsive means for rendering the first suction device operative and then both suction devices operative with increase in temperature.

6. In a system of control for intake heaters, the combination with an internal-combustion engine having an intake conduit and an exhaust conduit connected with engine exhaust outlets; of a jacket about said intake conduit and forming a by-pass about a portion of said exhaust conduit; a valve in said exhaust conduit located between certain exhaust outlets and the exit from said jacket; a valve controlling the entrance to said jacket, one valve being normally open and the other normally closed; a chamber in communication with the intake conduit provided with a cover plate; suction devices having connections passing through said cover plate and communicating with said chamber, each device for operating one of said valves; and a temperature responsive device within said chamber and supported by said cover for controlling said suction devices.

7. In a system of control for intake heaters, the combination with an internal-combustion engine having an intake conduit and an exhaust conduit; of a jacket about said intake conduit and forming a by-pass about a portion of said exhaust conduit; a valve in said exhaust conduit located between the entrance into and the exit from said jacket; a valve controlling the entrance to said jacket. one valve being normally open and the other normally closed; a chamber in communication with the intake conduit provided with a cover plate; suction devices having connections passing through said cover plate and communicating with said chamber, each device for operating one of said valves; and a thermostat supported by said cover within the chamber for opening and closing said connections.

8. In a system of control for intake heaters, the combination with an internal-combustion engine having an intake conduit and an exhaust conduit connected with the engine; of a jacket about said intake conduit having connection with the exhaust conduit outside the engine outlets; a valve in said exhaust conduit located between the extremities of said jacket; a valve controlling the entrance to said jacket, one valve being normally open and the other normally closed; suction devices in communication with the engine, each device for operating one of said valves; and a temperature responsive device for controlling said suction devices.

In testimony whereof I hereto affix my signature.

JOHN H. HUNT.

Witnesses:
WALTER W. RIEDEL,
CHAUNCEY D. MILLER.